(No Model.)
C. E. DAVEY.
FLUE CLEANER.
No. 513,176. Patented Jan. 23, 1894.
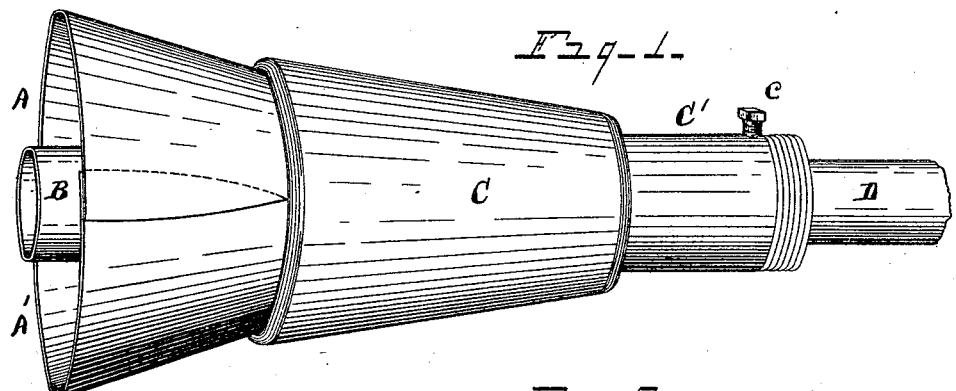
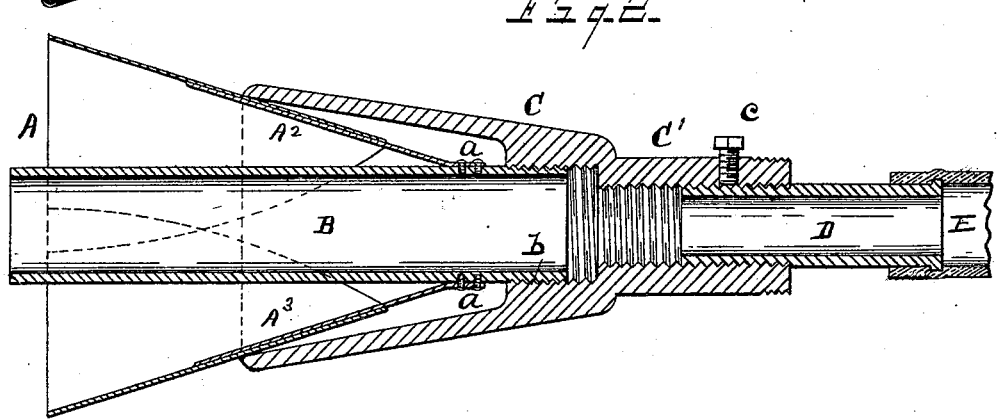
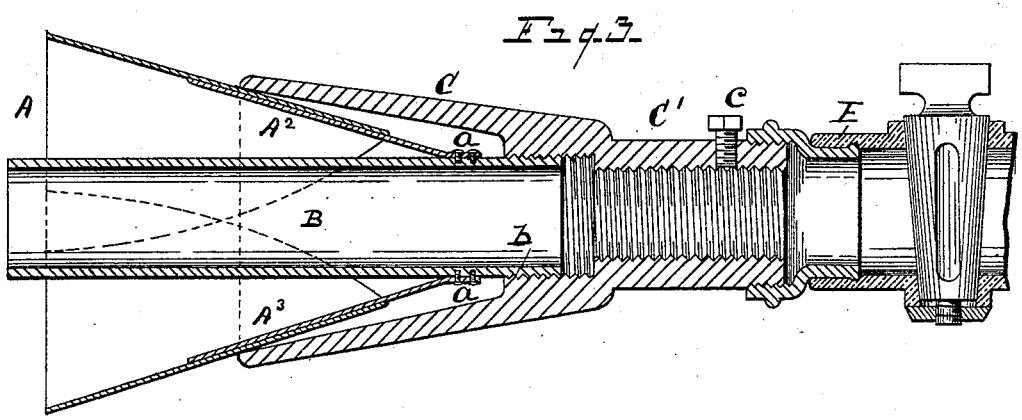
Witnesses
O. B. Baenziger
John F. Miller
Inventor
Charles E. Davey
By his Attorney
Newell S. Wright

UNITED STATES PATENT OFFICE.

CHARLES E. DAVEY, OF DETROIT, MICHIGAN.

FLUE-CLEANER.

SPECIFICATION forming part of Letters Patent No. 513,176, dated January 23, 1894.

Application filed April 28, 1893. Serial No. 472,173. (No model.)

*To all whom it may concern:*

Be it known that I, CHARLES E. DAVEY, a citizen of the United States, residing at Detroit, county of Wayne, State of Michigan, have invented a certain new and useful Improvement in Flue-Cleaners; and I declare the following to be a full, clear, and exact description of the invention, such as will enable others skilled in the art to which it appertains to make and use the same, reference being had to the accompanying drawings, which form a part of this specification.

My invention relates to certain new and useful improvements in a flue cleaner, embodying in one utensil a combined adjustable flue scraper and blower, and it consists of the devices and appliances, their construction, combination and arrangement as hereinafter specified and claimed, and illustrated in the accompanying drawings, in which—

Figure 1 is a view in perspective. Fig. 2 is a longitudinal section. Fig. 3 is a similar view showing a modification.

This present invention is more particularly designed as an improvement or a modification of a device of this class for which United States Letters Patent were granted to me March 7, 1893, No. 493,235.

My present object is more especially to adapt my improved flue cleaner for use as a blower and scraper combined in a single device, capable of being used either as a scraper, or as a blower, or as a blower and scraper combined, as may be desired, the blades being made easily adjustable while in the flue or tube in a ready and simple manner.

To these ends I carry out my invention as follows:

A and A' represent spring actuated blades made of conical or tapering form, flaring at the outer end.

$A^2$ and $A^3$ are interior spring arms with which said blades are engaged. The inner ends of the spring arms are secured in any suitable manner upon a steam pipe B, as by screws "$a$."

C represents a body also made of corresponding conical or tapering form, within which the smaller ends of said blades project, as shown, said body formed with a hollow stem C' with which the pipe B has a threaded engagement, as shown at "$b$." The union of said pipe with the body C is thus made adjustable. It will be seen that by rotating the body in the proper direction, it is advanced upon the blades, to narrow or contract the diameter thereof at their outer ends, and vice versa.

When the device is intended for use simply as a scraper, a handle D is screwed into the outer end of the stem of the body C. The union of the two may be made fixed by a set screw "$c$," so that by rotating the handle the body C will be rotated correspondingly. This feature is similar to that described in my former patent above referred to.

To adapt the device to be used as a blower, a tube or pipe E may have a screw threaded engagement with the stem C', preferably with the exterior thereof, as shown, or to adapt the device to be used as a combined scraper and blower, the handle D may be made tubular and the tube E be attached to the end thereof, as shown in Fig. 2.

The device is of superior simplicity, utility, durability and economy, and may easily and quickly be adjusted as required. It can be used either with steam or without, as may be preferred. By turning the handle the diameter of the scraper blades can be quickly adjusted, without the necessity of removing the device from the flue. The blades being spring actuated conform firmly and closely to the inner periphery of the flue, so that the steam and débris are always driven forward of the blades in cleaning the flue. It will be seen that new blades may readily be substituted at any time, when the blades have become worn, without having to repair or throw away the cleaner as a whole. Thus the device may be easily renewed at any time with but little expense, thereby practically making the scraper as good as new.

When the device is to be used as a scraper only, the handle D is engaged with the stem C'. When it is to be used as a blower only, the handle may be detached and the steam pipe E engaged therewith as hereinbefore mentioned, and shown in Fig. 3, or the handle D and steam pipe E may be connected with the body as above specified and shown in Fig. 2.

What I claim as my invention is—

1. A combined flue scraper and blower having in combination a tapering body C, tapering spring actuated blades A A' arc-shaped in cross section, having their smaller ends projecting into said body, a steam pipe B having an adjustable connection with said body and projecting forward on the interior of said blades, and a steam pipe E connected with the body, said body and blades rotatable the one with respect to the other to contract and expand the diameter of said blades, substantially as described.

2. A combined flue scraper and blower having in combination a tapering body C, tapering spring actuated blades A A' having their smaller ends projecting into said body, and steam pipes B and E engaged with said body, one of said steam pipes projecting forward within said blades, substantially as and in the manner described.

3. A combined flue scraper and blower, having in combination a tapering body, tapering spring actuated blades having their smaller ends projecting into said body, and a steam pipe B engaged within said blades and body, said body attachable to a handle, and to an additional steam pipe, substantially as described.

In testimony whereof I sign this specification in the presence of two witnesses.

CHARLES E. DAVEY.

Witnesses:
N. S. WRIGHT,
JOHN F. MILLER.